United States Patent
Peterson et al.

(10) Patent No.: US 6,801,923 B2
(45) Date of Patent: Oct. 5, 2004

(54) SYSTEM AND METHOD FOR A SINGLE-PASS MULTIPLE TAP FILTER

(75) Inventors: James R. Peterson, Portland, OR (US); Zhi Cong Luo, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 641 days.

(21) Appl. No.: 09/874,532

(22) Filed: Jun. 4, 2001

(65) Prior Publication Data

US 2003/0028568 A1 Feb. 6, 2003

(51) Int. Cl.[7] .............................................. G06F 17/17
(52) U.S. Cl. ...................................... 708/313; 382/300
(58) Field of Search ........................... 708/313; 382/300

(56) References Cited

U.S. PATENT DOCUMENTS 5,991,464 A  * 11/1999 Hsu et al. .................... 382/300
6,215,525 B1 *  4/2001 Fujino ......................... 348/452
6,320,619 B1    11/2001 Jiang .......................... 348/447
6,580,837 B1 *  6/2003 Johnson ....................... 382/300
2002/0076121 A1 *  6/2002 Shimizu et al. ............. 382/300

* cited by examiner

Primary Examiner—David H. Malzahn
(74) Attorney, Agent, or Firm—Dorsey & Whitney LLP

(57) ABSTRACT

A system and method for calculating an output value from a plurality of input sample values contributing to the output value in accordance with a respective weight value. A first intermediate value is interpolated for a first offset value from a first plurality of the input sample values and a second intermediate value is interpolated for a second offset value from a second plurality of the input sample values. The offset values are representative of the weight values of the input samples of the respective plurality of the input samples. The first and second intermediate values are combined to produce a resultant value which is subsequently blended with the remaining input sample values of the plurality in accordance with respective scaling values assigned to the resultant value and the remaining input sample values.

19 Claims, 6 Drawing Sheets

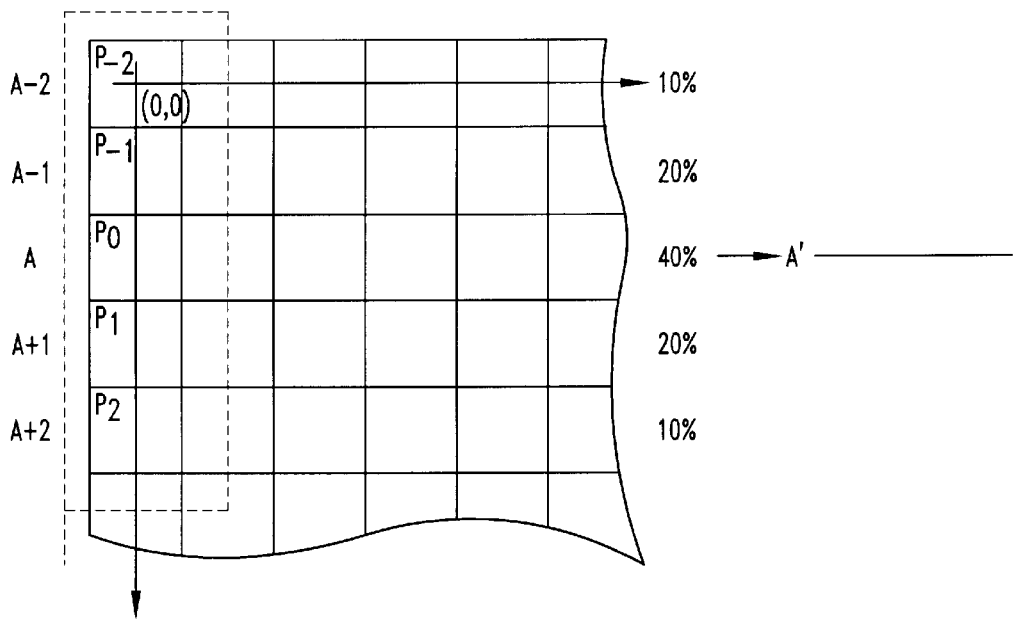
*Fig. 8A*
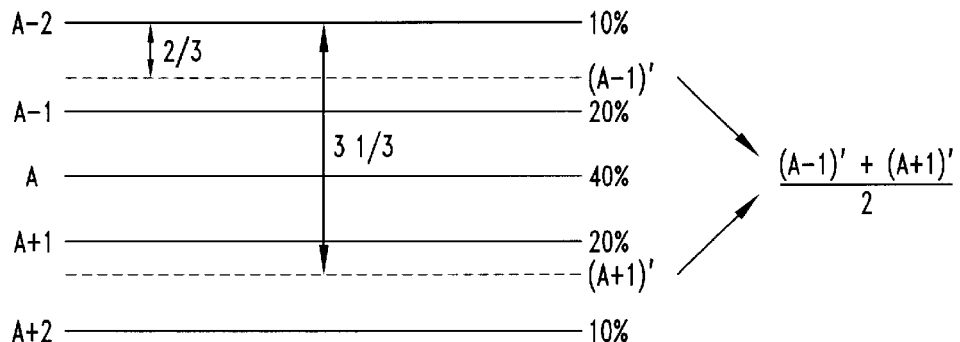
*Fig. 8B*
*Fig. 8C*

SYSTEM AND METHOD FOR A SINGLE-PASS MULTIPLE TAP FILTER

TECHNICAL FIELD

The present invention is related generally to the field of computer graphics, and more particularly, a system and method for resampling graphics data of a source image to produce a destination image.

BACKGROUND OF THE INVENTION

As visual output devices, such as computer monitors, printers, and the like, of various sizes and resolutions have been developed, and the demand for them have increased, the ability for a graphics processing system to resize and resample source images and create destination images to take advantage of the various sized and available resolutions of devices is a desirable operation. In an electronic display system, color at each pixel is typically represented by a set of color components, and each color component is represented by a sample value. Color components such as red, green, blue (RGB) or other representations such as $YC_bC_r$ are well known in the art. Whichever representation is chosen, each color component can be interpreted as a two dimensional array of samples, so three such arrays can represent images on display systems. Conceptually, resampling can be viewed as a spatial process, working on discrete input samples, represented by pixels of the source image arranged in a two-dimensional bitmap. The output samples of the destination image are spatially located at fractional sample positions within the input sample grid.

The resulting destination image, however, should retain an acceptable image quality with respect to the source image. That is, the destination image should appear to retain similar visual qualities of the source image, such as having nearly the same color balance, contrast, and brightness as the original source image. Otherwise, rather than accurately reproducing a resized graphics image of the source image, the rescaling operation will compromise image quality by introducing image distortion. To this end, various interpolation and filtering circuits and methods have been developed in order to create high quality destination graphics images.

In many conventional filtering algorithms where the resolution of a source image is reduced, a plurality of source samples are combined to yield a destination sample value. The method by which the source sample values are combined can be rather complicated. For example, the contribution of each of the source samples is typically weighted such that source samples that are more distant from the location of the destination relative to the position of the source samples contribute less to the resulting destination sample value. Moreover, the algorithm applied to combine the source sample values may include linear and non-linear models. Additionally, the number of source samples that are used in calculating the resulting destination value affects the quality of the resulting resized image.

Implementation of these conventional filtering algorithms generally require additional circuitry to be included in the graphics processing system to facilitate the filtering operation. The space consumed by such additional circuitry may also depend on the number of source samples used in calculating the destination value, that is, the number of "taps" required to sample the source sample values. The more taps filter circuitry requires, the more complicated the circuitry becomes and the more space that is necessary to accommodate the circuitry. Although dedicated filtering circuitry improves processing throughput, where space is limited or miniature device size is desired, the inclusion of the additional dedicated filtering circuitry may not be an acceptable alternative. An alternative approach to implementing conventional multi-sample filtering algorithms is to include minimal additional dedicated filtering circuitry, but repeat certain processes through the same circuitry to yield a final output destination value. In effect, performance of the filtering operation requires multiple passes through the filtering circuitry. Although the space consumed by the circuitry is minimized, graphics processing throughput may suffer because of the bottleneck the multiple pass filtering process creates.

Therefore, there is a need for an alternative system and method for implementing a multi-tap filter in a graphics processing system.

SUMMARY OF THE INVENTION

The present invention relates to a system and method for calculating an output value from a plurality of input sample values. Each of the input sample values contributing to the output value according to a respective weight value. A first intermediate value is interpolated for a first offset value from a first plurality of the input sample values and a second intermediate value is interpolated for a second offset value from a second plurality of the input sample values. The offset values are representative of the weight values of the input samples of the respective plurality of the input samples. The first and second intermediate values are combined to produce a resultant value which is subsequently blended with the remaining input sample values of the plurality in accordance with respective scaling values assigned to the resultant value and the remaining input sample values. The

BRIEF DESCRIPTION OF THE DRAWINGS

FIGS. 8A–8C are conceptual representations of a filtering application of the present invention.

DETAILED DESCRIPTION OF THE INVENTION

Embodiments of the present invention provide a single-pass five-tap filter for generating an output sample value based on five input sample values applied with different weighting factors. Embodiments of the present invention can be implemented using existing processing stages of a graphics processing system, thus, reducing the need for additional processing circuitry to carry out the five-tap filtering process. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
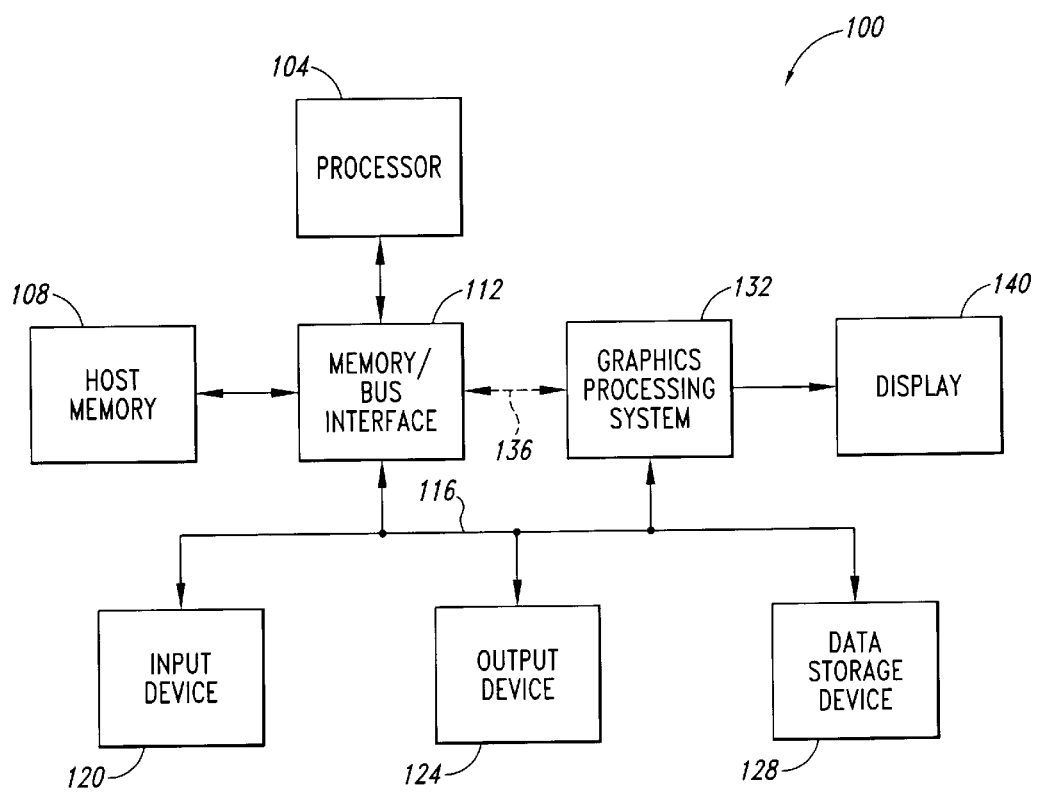
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
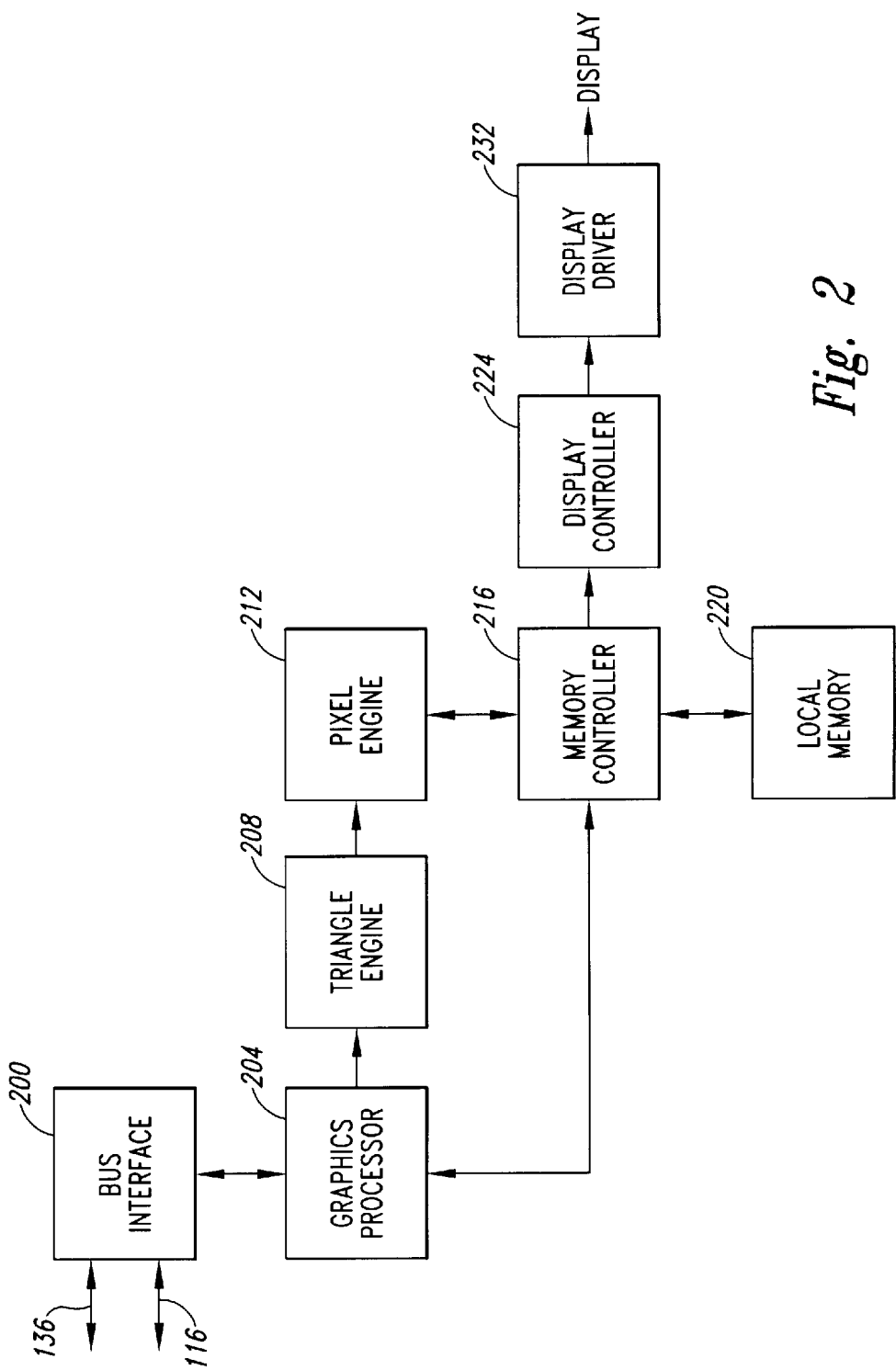
FIG. 2 is a block diagram of a graphics processing system in the computer system of FIG. 1.

FIG. 2 illustrates circuitry included within the graphics processing system 132 for performing various three-dimensional (3D) graphics functions. It will be appreciated that the graphics processing system 132 illustrated in FIG. 2 may include additional circuitry not specifically shown therein, and that the description is provided merely for the purposes of illustration. The following description of the particular functionality and operation of the graphics processing system 132 is not intended to limit the scope of the present invention to the specific embodiments discussed below. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208, which includes circuitry for performing various graphics functions, such as attribute transformations, calculating texel coordinates of a texture map, and rendering of graphics primitives.

A pixel engine 212 is coupled to receive the graphics data generated by the triangle engine 208. The pixel engine 212 contains circuitry for performing various graphics functions, such as, but not limited to, clipping, texture application or mapping, bilinear filtering, fog, blending, and color space conversion. The graphics functions are performed by a pixel processing pipeline 214 that is included in the pixel engine 212.

A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. The destination color values are subsequently provided to a display driver 232 that includes circuitry to provide digital color signals, or convert digital color signals to red, green, and blue analog color signals, to drive the display 140 (FIG. 1).

Figure 3:
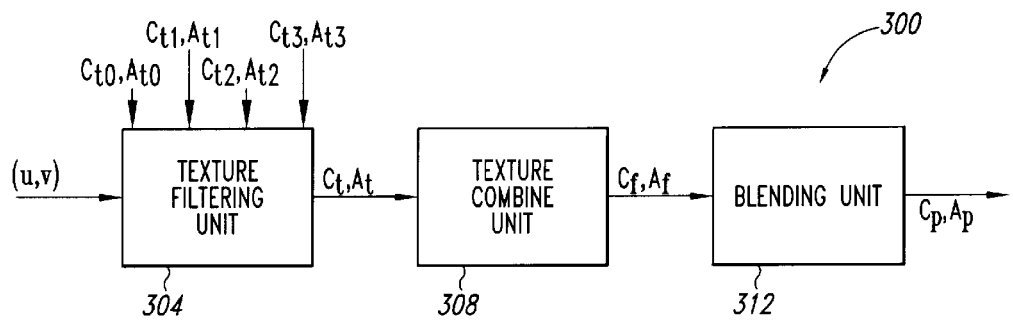
FIG. 3 is a block diagram of a portion of a pixel pipeline of the graphics processing system of FIG. 2 according to an embodiment of the present invention.

FIG. 3 illustrates a portion of a pixel pipeline 300 that may be included in the pixel engine 212 (FIG. 2). The pixel pipeline 300 includes a texture filtering unit 304, a texture combine unit 308, and a blending unit 312. Pixel processing through the pixel pipeline 300 is made in a "single-pass." That is, pixel attributes such as color and opacity, or alpha, values are calculated in a pipeline fashion, where processing begins with the texture filtering unit 304 and proceeds through the texture combine unit 308 and the blending unit 312 to produce output values of a pixel in a single-pass through the pipeline 300. As will be explained in more detail below, in operation, the texture filtering unit 304, texture combine unit 308, and the blending unit 312 are used to implement a single-pass five-tap filter, unlike conventional five-tap filters that perform the filtering operation in multiple passes. The texture filtering unit 304, texture combine unit 308 and the blending unit 312 will be described with respect to FIGS. 3–6, and will be followed by a description of a single-pass five-tap filtering operation implemented therein.

The texture filter unit 304 performs filter functions on texture data. The texture filter unit 304 includes circuitry for performing filter functions for a plurality of textures. As briefly mentioned above, the triangle engine 208 provides the pixel engine 212 information such as pixel addresses and corresponding texel addresses. The texture filter unit 304 uses the information to generate attributes of a pixel, such as its color, opacity, and the like, through a filter process. One filtering method that may be used by the texture filtering unit 304 in calculating the attributes of a pixel is bilinear interpolation. As is well known in the art, bilinear interpolation applies a linear function in calculating a weighting value for each color of four adjacent texels $C_{t0}$–$C_{t3}$ based on the "location" of the pixel relative to the four texels. The resulting pixel color $C_t$ is the sum of the color values of the four source pixels, weighted by the appropriate weighting value. Bilinear interpolation, as well as conventional filtering methods that may be implemented in the texture filtering unit 304, are well known in the art. Coupled to the texture filtering unit 304 to receive the calculated attributes for the pixels, such as color value $C_t$ and opacity or alpha value $A_t$ is the texture combine unit 308. The texture combine unit 308 is capable of combining the color values received from the texture filtering unit with constant color and alpha values $C_c$ and $A_c$, or the attributes of other pixels having different textures applied to them. The resulting fragment attributes $C_f$ and $A_f$ are provided by the texture combine unit 308 to the blending unit 312. The blending unit 312 performs blending operations, such as determining output color and alpha values $C_p$ and $A_p$ for pixels based on the opacity and color of two or more pixels that will be overlaid in the final image.

It will be appreciated that the texture filtering unit 304, the texture combine unit 308, and the blending unit 312 may further perform other conventional graphics processing and operations in addition to those previously described. For example, the stages previously discussed may also perform operations to combine opacity values for pixels, mipmapping and dithering operations, as well as performing fog effect or level-or-detail calculations. Moreover, as previously mentioned, FIG. 3 illustrates a portion of a pixel pipeline. It will be further appreciated that additional stages or circuitry may be included as well, such as cache memory for temporary storage of texture and pixel data, a lighting unit to perform lighting calculations, and the like. In the interest of brevity, a more detailed description has been omitted from herein.

Figure 4:
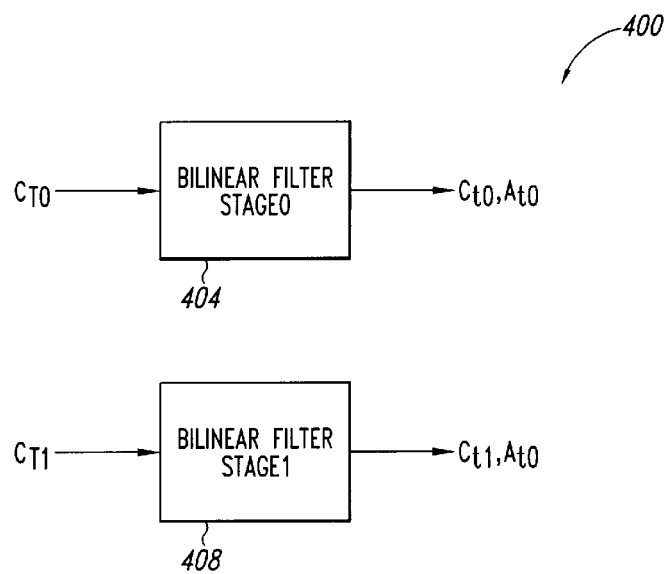
FIG. 4 is a block diagram of a bilinear filter stage of the pixel pipeline of FIG. 3.

Shown in FIG. 4 is a bilinear filter stage 400 that may be included in the texture filter unit 304 (FIG. 3). The bilinear filter stage 400 includes a first bilinear filter stage 404 and a second bilinear filter stage 408. Each bilinear filter stage can apply a different texture, namely a first texture $C_{T0}$ and a second texture $C_{T2}$. Each filter stage performs a conventional bilinear interpolation operation from the four respective texel color values $C_{t0}$–$C_{t3}$ to calculate a respective pixel color value $C_t$. That is, $$C_t = \text{Weight}_0 \cdot C_{t0} + \text{Weight}_1 \cdot C_{t1} + \text{Weight}_2 \cdot C_{t2} + \text{Weight}_3 \cdot C_{t3}$$

where $$\text{Weight}_0 = (1-rU) \cdot (1-rV), \text{Weight}_1 = (rU) \cdot (1-rV),$$

$$\text{Weight}_2 = (1-rU) \cdot (rV), \text{ and Weight}_3 = (rU) \cdot (rV),$$

where rU and rV are the fractional coordinates of the pixel for which the pixel color value $C_t$ is being calculated.

Figure 5:
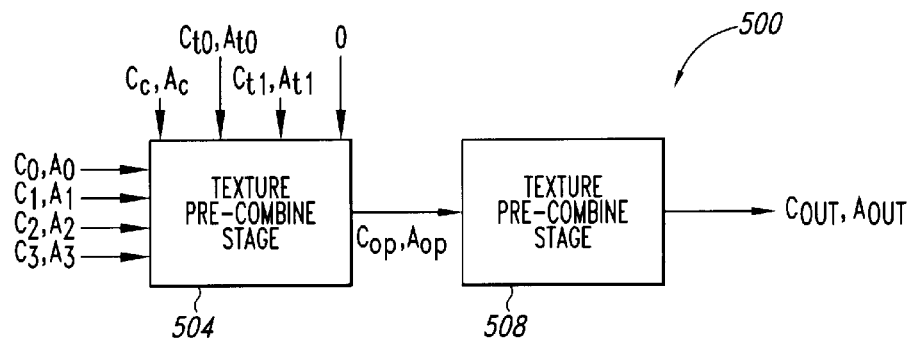
FIG. 5 is a block diagram of a combining stage of the pixel pipeline of FIG. 3.

Shown in FIG. 5 are a texture pre-combine stage 504 and a texture post-combine stage 508 that are included in the texture combine unit 308 (FIG. 3). Both the texture pre-combine stage 504 and the post-combine stage 508 perform pixel attribute combination operations. As illustrated in FIG. 5, the texture pre-combine stage 504 receives up to four different input color and alpha values $C_0$–$C_3$ and $A_0$–$A_3$. The input values can be selected from several different values, for example, constant color and alpha values $C_c$ and $A_c$, a constant value such as zero, or the output of the bilinear filter stages 404 and 408 (FIG. 4) $C_{t0}$, $A_{t0}$ and $C_{t1}$, $A_{t1}$. Selection of the input values can be made programmatically. Although not shown in FIG. 4, it will be appreciated that the values from which the input values $C_0$–$C_3$ can be selected may include other values as well.

As mentioned previously, the texture pre-combine stage 504 can perform various pixel attribute combination operations to generate output values $C_{op}$ and $A_{op}$. Typical combine operations that the texture pre-combine stage 504 can perform include various Boolean logic operations, such as $$C_{op}=C0 \text{ AND } C3, C_{op}=C0 \text{ OR } C3, \text{ and } C_{op}=C0 \text{ XOR } C3,$$

as well as more sophisticated combine operations, such as $$C_{op}=C0*(C1-C2)+C3.$$

Selection of the particular operation that is performed by the texture pre-combine stage 504 is made programmatically.

The texture post-combine stage 508 receives the output values $C_{op}$ and $A_{op}$ from the texture pre-combine stage 504 and can perform a variety of additional operations to calculate output values $C_{out}$ and $A_{out}$ therefrom. Examples of the types of operations that can be performed by the texture post-combine stage 508 include:

| | |
|---|---|
| no operation | $C_{out} = C_{op}$ |
| modulate 2x | Cout = Cop << 1 |
| demodulate 2x | Cout = Cop >> 1 |
| sum | Cout = Cr + Cg + Cb, RGB color components |

As with the texture pre-combine stage 504, the selection of the operation can be made programmatically.

Figure 6:
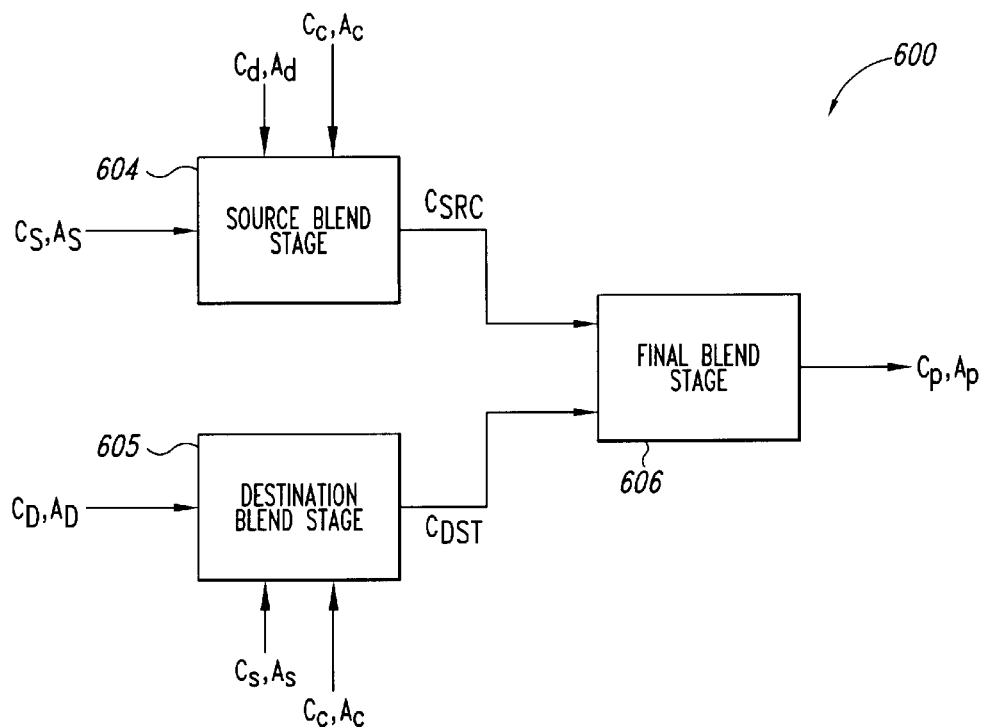
FIG. 6 is a block diagram of a blending stage of the pixel pipeline of FIG. 3.

FIG. 6 illustrates blending stages 604–606 that are included in the blending unit 312. The source blending stage 604 blends source color and alpha values $C_s$ and $A_s$ with destination color and alpha values $C_d$ and $A_d$, or constant color and alpha values $C_c$ and $A_c$ to produce blended output values $C_{src}$ and $A_{src}$. Similarly, the destination blending stage 605 blends the destination color and alpha values $C_d$ and $A_d$ with the source color and alpha values $C_s$ and $A_s$ or the constant color and alpha values $C_c$ and $A_c$ to produce blended output values $C_{dst}$ and $A_{dst}$. For example, with respect to the source blending stage 604, some of the source blend operations that can be performed include:

| Operation | RGB | Alpha |
|---|---|---|
| BlendDstColor | $C_s*C_d$ | $A_s*A_d$ |
| BlendDstAlpha | $C_s*A_d$ | $A_s*A_d$ |
| BlendSrcColor | $C_s*C_s$ | $A_s*A_s$ |
| BlendSrcAlpha | $C_s*A_s$ | $A_s*A_s$ |
| BlendConstColor | $C_s*C_c$ | $A_s*A_c$ |
| BlendConstAlpha | $C_s*A_c$ | $A_s*A_c$ |
| Blend0 | 0 | 0 |
| Blend1 | $C_s$ | $A_s$ |

Similarly, the destination blending stage 605, the destination blend operations can include:

| Operation | RGB | Alpha |
|---|---|---|
| BlendSrcColor | $C_d*C_s$ | $A_d*A_s$ |
| BlendSrdAlpha | $C_d*A_s$ | $A_d*A_s$ |
| BlendDestColor | $C_d*C_d$ | $A_d*A_d$ |
| BlendDestAlpha | $C_d*A_d$ | $A_d*A_d$ |
| BlendConstColor | $C_d*C_c$ | $A_d*A_c$ |
| BlendConstAlpha | $C_d*A_c$ | $A_d*A_c$ |
| Blend0 | 0 | 0 |
| Blend1 | $C_d$ | $A_d$ |

The final blend stage 606 receives the output $C_{src}$, $A_{src}$, $C_{dst}$ and $A_{dst}$ of the source and destination blending stages 604 and 605, respectively, and performs a final blending operation to produce output color and alpha values $C_p$ and $A_p$. Examples of the types of final blending operations included are:

$$C_p = C_{src} + C_{dst},$$

$$C_p = C_{src} - C_{dst}, \text{ and}$$

$$C_p = C_{dst} - C_{src}.$$

The blending operations of the source and destination blending stages 604 and 605, respectively, and the final blending stage 606 are selected programmatically.

It will be appreciated that the various processing stages shown in and described with respect to FIGS. 4–6 are conventional in design and functionality. Those of ordinary skill in the art have sufficient understanding to practice the present invention based on the description provided herein. For example, the programmability of the various processing stages and the selection of the particular values for processing is well known in the art. Consequently, in order to avoid unnecessarily obscuring the invention, further description has been omitted from herein. It will be further appreciated that the color values may consist of several different components. For example, the color value may represent pixel colors which are the combination of red, green, and blue color components. Another example includes color values representing pixel colors which are the combination of luma and chroma components. Consequently, because it is well understood in the art, although circuitry to perform graphics operation for each of the components is not expressly shown or described herein, embodiments of the present invention include circuitry, control signals, and the like necessary to perform processing on each component for multi-component color values.

Operation of the single-pass five-tap filter will be described with respect to FIGS. 7 and 8A–C. As mentioned previously, the five-tap filtering operation is performed in a single pass through the pixel pipeline 300 (FIG. 3). The flow diagram of FIG. 7 describes the single-pass process and FIGS. 8A–C illustrate a particular application of the single-pass process. In FIG. 8A, five scanlines A-2, A-1, A, A+1, and A+2 of pixels arranged in the manner shown, will be reduced to a single scanline A' in a single-pass. The color values of the pixels of the scanlines A-2, A-1, A, A+1, and A+2 will contribute to the color value of the pixels of the final scanline A' according to the weights 10%, 20%, 40%, 20%, and 10%, respectively. It will be appreciated that the scanlines are composed of individual pixels arranged in succession along the respective scanline. The five color samples $C_{A-2}$, $C_{A-1}$, $C_A$, $C_{A+1}$, and $C_{A+2}$ for the filtering process are taken from the location of a pixel from in each of the five scanlines where the pixels are aligned in a common column, such as pixels $P_{A-2}$, $P_{A-1}$, $P_A$, $P_{A+1}$, and $P_{A+2}$. The result of the filter process is to provide a destination pixel $P_A'$ having a color value $C_A'$ that is the combination of the color values $C_{A-2}$, $C_{A-1}$, $C_A$, $C_{A+1}$, and $C_{A+2}$ of the five pixels sampled from each scanline. As the filtering process proceeds to subsequent pixels along each scanline, a destination scanline A' will be generated.

Figure 7:
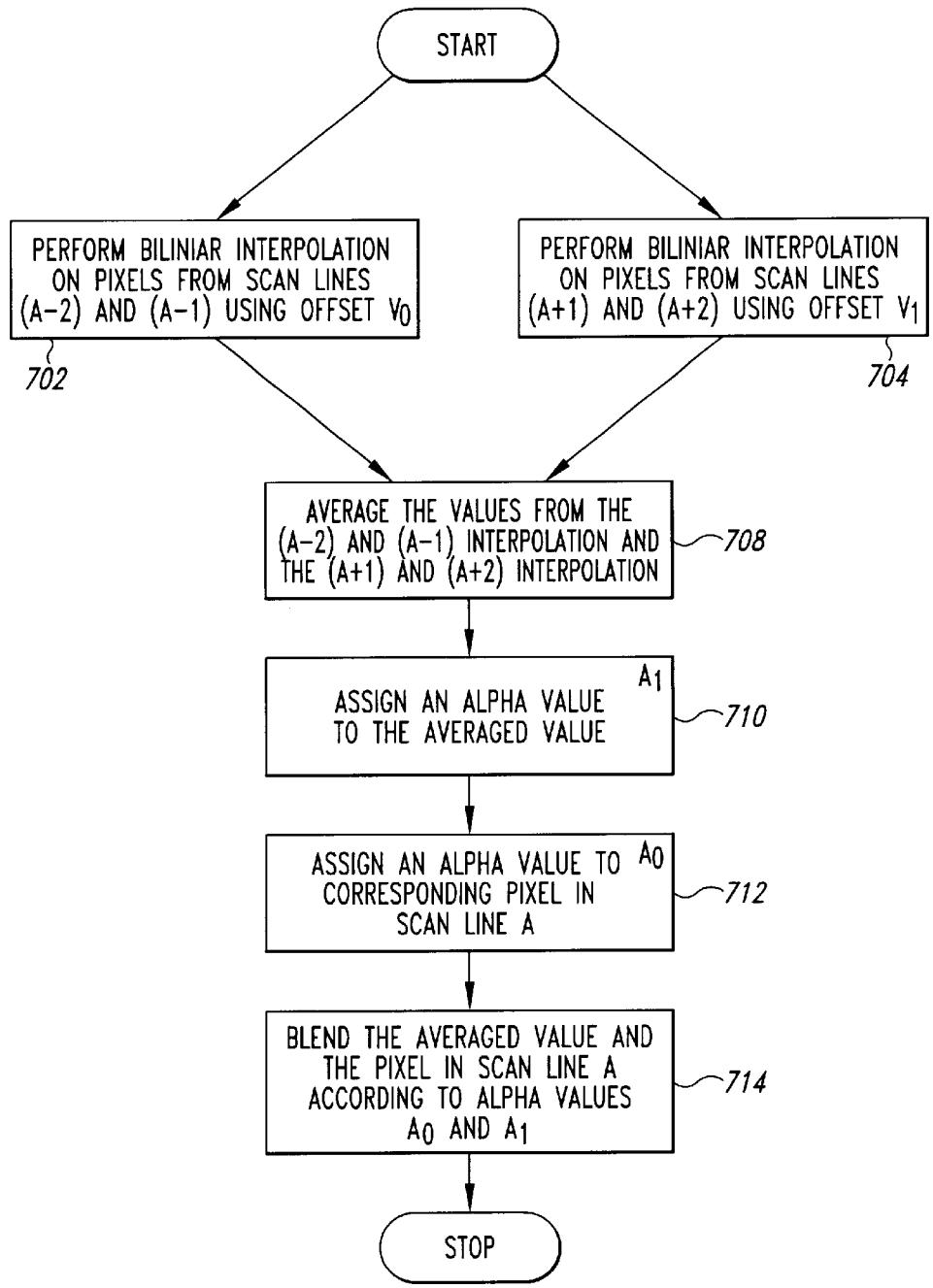
FIG. 7 is a flow diagram illustrating an embodiment of the present invention.

The five-tap filtering process begins with performing bilinear interpolation of a pixels $P_{A-2}$ and $P_{A-1}$ from scanlines A-2 and A-1, respectively (step 702, FIG. 7). Note that the destination pixel $P_A'$ is aligned in the same column as the pixels $P_{A-2}$ and $P_{A-1}$. That is, the fractional horizontal position rU with respect to the pixels $P_{A-2}$ and $P_{A-1}$ is zero, and consequently, the "bilinear" operation is reduced to a linear interpolation between the pixels $P_{A-2}$ and $P_{A-1}$. Additionally, as shown in FIG. 8A, the contribution of scanlines A-2 and A-1 to the final scanline A' are 10% and 20% respectively. By determining and providing appropriate coordinate values, a conventional bilinear filter stage can be used to perform the interpolation process of step 702. For example, a vertical offset value $V_0$, which is measured relative to the scanline A-2, is calculated and provided to the bilinear filter stage 404 (FIG. 4) such that the contribution of the pixel $P_{A-1}$ carries twice the weight of the contribution of the pixel $P_{A+2}$ to the color value $C_{A-1}'$ of an output pixel $P_{A-1}'$. As mentioned previously, for the interpolation operation of step 702, the fractional horizontal position is zero. Thus, the coordinates that are provided to the bilinear filter stage 404 are (0, ⅔), that is, the output pixel $P_{A-1}'$ is in the same column as $P_{A-1}$ and $P_{A-2}$, and the vertical offset $V_0$ from the scanline A-2 is equal to two-thirds. As a result, the bilinear interpolation equation reduces to (⅓ $C_{A-1}$ + ⅔ $C_{A-2}$), and the output $C_{r0}$ of the bilinear filter stage 404 is the color value $C_{A-1}'$ for the pixel $P_{A-1}'$.

The pixels $P_{A+1}$ and $P_{A+2}$, from scanlines A+1 and A+2, respectively, are also interpolated (step 704) in a manner similar to that previously described with respect to pixels $P_{A-2}$ and $P_{A-1}$. However, the vertical offset $V_1$ for the interpolation of pixels $P_{A+1}$ and $P_{A+2}$ is adjusted such that when measured from the scanline A-2, the contribution of $P_{A+1}$ is twice that of the contribution by $P_{A+2}$ to the color value $C_{A+1}'$ of an output pixel $P_{A+1}'$. The horizontal offset is still zero. Thus, the coordinates that are provided to the bilinear filter stage 408 are (0, 3⅓). As a result, the bilinear interpolation equation reduces to (⅔ $P_{A+1}$ + ⅓ $P_{A+2}$) and the output $C_{r1}$ of the bilinear filter stage 408 is the color value $C_{A+1}'$ for $P_{A+1}'$. Although interpolation steps 702 and 704 are shown in FIG. 7, and described with respect bilinear filter stages 404 and 408, as being performed in parallel, it will be appreciated that the interpolation process may be performed sequentially instead.

Following the interpolation of pixels $P_{A-2}$ and $P_{A-1}$, and $P_{A+1}$ and $P_{A+2}$, the two interpolated color values $C_{A-1}'$ and $C_{A+1}'$ for output pixels $P_{A-1}'$ and $P_{A+1}'$, respectively, are averaged (step 708). By programming the texture pre-combine stage 504 and a texture post-combine stage 508, shown in FIG. 5, to perform the appropriate calculations on selected input values, the stages 504 and 508 can be used to perform the averaging operation of step 708. That is, as mentioned previously, the texture pre-combine stage 504 can be programmed to calculate an output value $C_{op}$ from the equation:

$$C_{op} = C0 * (C1 - C2) + C3,$$

and the texture post-combine stage 508 can be programmed to perform a demodulate-by-two operation such that:

$$C_{out} = C_{op} >> 1.$$

By selecting the input values C0–C3 to the texture pre-combine stage 504 to be:

$$C0 = C_{r0},\ C1 = C_c = 1,\ C_2 = 0,\ \text{and}\ C_3 = C_{r1},$$

the color values for the output pixels $P_{A-1}'$ and $P_{A+1}'$ are averaged, that is:

$$C_{out} = [C_{r0} * (1-0) + C_{r1}] >> 1,\ \text{or}$$

$$C_{out} = [C_{r0} + C_{r1}] >> 1,$$

where $C_{out}$ is the averaged color value of $C_{r0}$ and $C_{r1}$.

The averaged color value $C_{out}$ is then blended with the color value $C_A$ of a pixel $P_A$ (step 714), a pixel from the scanline A in the same column as pixels $P_{A-2}$, $P_{A-1}$, $P_{A+1}$, and $P_{A+2}$. The color values are alpha blended using alpha values programmed corresponding to the weights defined in FIGS. 8A–C (steps 710, 712). The alpha value $A_A$ assigned to the pixel $P_A$ is selected such that it corresponds to the 40% weight the color value $C_A$ contributes to the output color value $C_A'$ of the output pixel $P_A'$. Accordingly, the alpha value $A_{out}$ for the averaged color value $C_{out}$ is assigned a value 60%, such that the total contribution of the $C_A'$ and $C_{out}$ are equal to 100%.

The blending operation is performed in the blending stages 604–606 (FIG. 6). As previously discussed, the source blending stage 604 and the destination blending stage 605 can be programmed to perform a select blending operation with various input color and alpha values. The source blending stage 604 is programmed to perform the blending operation:

$$C_{src} = C_s * A_c,$$

and the destination blending stage 605 is programmed to perform the blending operation:

$$C_{dst} = C_d * C_c.$$

The final blending stage 606 is programmed to perform a final blend operation:

$$C_p = C_{src} + C_{dst}.$$

A value is programmed for constant color and alpha values $C_c$ and $A_c$ such that the source and destination blending operations will weight the contribution of the color values $C_{out}$ and $C_A$ accordingly, when the final blend stage 606 blends $C_{src}$ and $C_{dst}$ to produce the color value $C_A'$ of the output pixel $P_A'$. That is, the effective alpha value $A_{out}$ is equal to $A_c$ and the effective alpha value $A_A$ is equal to $C_c$. Where actual percentage values cannot be programmed, it may be necessary to program equivalent values for $A_c$ ($=A_{out}$) and $C_c$ ($=A_A$), that are representative of the respective alpha percentages. For example, where a 32-bit number is used for $C_c$ and $A_c$, such that the eight most significant bits represent $A_c$ and the 24 least significant bits represent $C_c$, the appropriate value for a 40%/60% weighting is 99666666H. Thus, to have the blending stages 604–606 perform the blending operation of step 714:

$$C_s = C_{out}, C_d = C_0, A_c \cdot C_c = 99666666H,$$

resulting in:

$$C_p = (C_s * A_c) + (C_d * C_c), \text{ or}$$

$$C_p = (C_s * 60\%) + (C_d * 40\%).$$

The color value $C_p$ is the final color value $C_A'$ for the output pixel $P_A$. It can be shown, as follows, that the process previously described yields a color value having the correct weighting as defined in FIG. 8A.

$$C_{A'} = \frac{6}{10} \cdot \left[ \frac{\left(\frac{1}{3}C_{A-2} + \frac{2}{3}C_{A-1}\right) + \left(\frac{2}{3}C_{A+1} + \frac{1}{3}C_{A+2}\right)}{2} \right] + \frac{4}{10}C_A$$

$$C_{A'} = \frac{6}{10} \cdot \left[ \left(\frac{1}{6}C_{A-2} + \frac{2}{6}C_{A-1}\right) + \left(\frac{2}{6}C_{A+1} + \frac{1}{6}C_{A+2}\right) \right] + \frac{4}{10}C_A$$

-continued $$C_{A'} = \frac{1}{10}C_{A-2} + \frac{2}{10}C_{A-1} + \frac{4}{10}C_A + \frac{2}{10}C_{A+1} + \frac{1}{10}C_{A+2}$$

It will be appreciated that the weights shown in FIG. 8 and the corresponding values described with respect thereto are exemplary, and that other weights can be used as well. To accommodate different weights used in the single-pass five-tap filtering process may need to be adjusted. For example, the vertical offsets used in interpolating between pixels $P_{A-2}$ and $P_{A-1}$ and pixels $P_{A+1}$ and $P_{A+2}$ may need to be adjusted, as well as the constant color and alpha values $C_c$ and $A_c$ used in the blending operation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for calculating an output value from a plurality of input sample values, each having respective weight values of contribution to the output value, the method comprising:

for a first offset value, interpolating a first intermediate value from a first plurality of the input sample values, the first offset value representative of the respective weight values of the input sample values of the first plurality;

for a second offset value, interpolating a second intermediate value from a second plurality of the input sample values, the second offset value representative of the respective weight values of the input sample values of the second plurality;

combining the first and second intermediate values to produce a resultant value; and blending together the resultant value and remaining input sample values in accordance with respective scaling values assigned thereto.

2. The method of claim 1 wherein the first and second plurality are equal in the number of input sample values.

3. The method of claim 1 wherein the scaling values of the remaining input sample values equal to the respective weight values and the scaling value of the resultant value equal to the sum of the respective weight values of the first and second plurality of the input sample values.

4. The method of claim 1 wherein the first plurality of the input sample values comprises two values and interpolating first and second intermediate values comprises applying a linear interpolation method.

5. The method of claim 1 wherein combining the first and second intermediate values comprises averaging the first and second intermediate values.

6. The method of claim 1 wherein the first plurality of the input sample values comprises two input sample values $C_{t0}$ and $C_{t1}$, respectively, and interpolating the first intermediate value comprises calculating the first intermediate value $C_1$ from the equation, $$C_t = C_{t0} \cdot (1 - V_0) + C_{t1} \cdot V_0,$$

where $V_0$ is the first offset value.

7. The method of claim 1, further comprising programming a value representative of the scaling values of the resultant value and the remaining input sample values.

8. A method for calculating an output value from a plurality of input sample values, each having respective weight values of contribution to the output value, the method comprising:

linearly interpolating a first intermediate value from a first pair input sample values for a first input offset value, the first input offset value based on the respective weight values of the input sample values of the first pair;

linearly interpolating a second intermediate value from a second pair input sample values for a second input offset value, the second offset value based on the respective weight values of the input sample values of the second pair;

averaging the first and second intermediate values to produce a resultant value; and blending together the resultant value and a center sample value in accordance with respective scaling values assigned thereto, the scaling values of the center sample value equal to its weight value and the scaling value of the resultant value equal to the sum of the respective weight values of the first and second pairs of input sample values.

9. The method of claim 8 wherein the plurality of input sample values comprises five sample values.

10. The method of claim 9 wherein the weight values for first, second, third, fourth, and fifth input sample values are 10%, 20%, 40%, 20%, and 10%, respectively.

11. The method of claim 8 wherein averaging the first and second intermediate values comprises:

programmatically selecting as input values the first and second intermediate values;

programming a combining stage to sum the first and second intermediate values and shift a binary representation of the sum one bit to the left.

12. The method of claim 8 wherein blending together the resultant value and the center sample value comprises summing together the product of the resultant value and its scaling value and the product of the center sample value and its scaling value.

13. The method of claim 8 wherein linearly interpolating the first and second intermediate value comprises programming a bilinear interpolation stage to calculate an output value from the respective pair of input sample values at the respective input offset value.

14. A method for calculating an output value from a plurality of input sample values, each having respective weight values of contribution to the output value, the method comprising:

programming a bilinear filter stage to interpolate first and second intermediate values from first and second pairs of input sample values at first and second offset values, all respectively, each offset value representative of the weight values of the input sample values of the respective pair of input sample values;

programming a combine stage to average the first and second intermediate values; and programming a blending circuit to sum together the product of the average of the first and second intermediate values and a first scaling value and the product of a center sample value and a second scaling value, the first scaling value equal to the sum of the weight values of the input sample values of the first and second pairs of input sample values and the second scaling value equal to the weight value of the center sample value.

15. The method of claim 14 wherein programming a combine stage comprises:

programming a pre-combine stage to sum the first and second intermediate values; and programming a post-combine stage to shift a binary representation of the sum one bit to the left.

16. An apparatus for calculating an output value from a plurality of input sample values, each of the input sample values having respective weight values of contribution to the output value, the apparatus comprising:

interpolation circuitry having input terminals for receiving first and second pluralities of the input sample values and first and second offset values and further having output terminals to provide first and second intermediate values, respectively, the interpolation circuitry calculating a first interpolated intermediate value from the first plurality of the input sample values for the first offset value and further calculating a second interpolated intermediate value from the second plurality of the input sample values for the second offset value, each offset value representative of the weight values of the input sample values of the respective plurality of input sample values;

combining circuitry having input terminals coupled to the output terminals of the interpolation circuitry and further having an output terminal, the combining circuitry combining the first and second intermediate values to provide a resultant value at the output terminal; and blending circuitry having a first input terminal coupled to the output terminal of the combining circuitry to receive the resultant value and a second input terminal for receiving a center sample value, the blending circuitry further having first and second opacity terminals for receiving respective opacity values, the blending circuitry blending together the resultant value and center sample value in accordance with the opacity values.

17. The apparatus of claim 16, further comprising a register coupled to the interpolation circuitry and the blending circuitry, the register storing the first and second offset values and the opacity values.

18. The apparatus of claim 16 wherein the combining circuitry comprises:

a pre-combine stage having first and second input terminals coupled to receive the first and second intermediate values and sum the values together; and a post-combine stage having an input terminal coupled to receive the sum of the intermediate values from the pre-combine stage, the post-combine stage shifting a binary representation of the sum one bit to the left.

19. The apparatus of claim 16 wherein the interpolation circuitry comprises a first bilinear filter stage coupled to receive the first plurality of input sample values and the first offset value and a second bilinear filter stage coupled to receive the second plurality of input sample values and the second offset value, the bilinear filter stages linearly interpolating the first and second intermediate values from the respective pluralities of input sample values.

* * * * *

UNITED STATES PATENT AND TRADEMARK OFFICE
CERTIFICATE OF CORRECTION

PATENT NO. : 6,801,923 B2
APPLICATION NO. : 09/874532
DATED : October 5, 2004
INVENTOR(S) : James R. Peterson and Zhi Cong Luo It is certified that error appears in the above-identified patent and that said Letters Patent is hereby corrected as shown below:

| Column, Line | Reads | Should Read |
|---|---|---|
| Column 2, Line 23 | "values. Each of the input" | --values, each of the input-- |
| Column 2, Line 36 | "sample values. The" | --sample values.-- |
| Column 3, Line 19 | "operator or an" | --operator of an-- |
| Column 4, Line 25 | "from an local memory" | --from a local memory-- |
| Column 5, Line 25 | "level-or-detail" | --level-of-detail-- |
| Column 6, Line 52 | "Similarly, the destination" | --Similarly, in the destination-- |
| Column 7, Line 31 | "operation for each" | --operations for each-- |
| Column 7, Line 52 | "pixel from in each" | --pixel in each-- |
| Column 8, Line 11 | "the pixel $P_{A+2}$" | --pixel $P_{A-2}$-- |
| Column 8, Line 34 | "with respect bilinear" | --with respect to bilinear-- |
| Column 8, Line 35 | "404 and 408, as being" | --404 and 408 as being-- |
| Column 9, Line 58 | "pixel $P_A$ ." | --pixel $P_A'$.-- |
| Column 10, Line 8 | "weights used in the" | --weights used, the-- |

UNITED STATES PATENT AND TRADEMARK OFFICE
CERTIFICATE OF CORRECTION

PATENT NO. : 6,801,923 B2
APPLICATION NO. : 09/874532
DATED : October 5, 2004
INVENTOR(S) : James R. Peterson and Zhi Cong Luo It is certified that error appears in the above-identified patent and that said Letters Patent is hereby corrected as shown below:

Column 11, line 2    "pair input sample"    --pair of input sample--

Column 11, line 7    "pair input sample"    --pair of input sample--

Signed and Sealed this

Twenty-second Day of August, 2006

JON W. DUDAS
*Director of the United States Patent and Trademark Office*